United States Patent
Kim et al.

(10) Patent No.: US 7,738,420 B2
(45) Date of Patent: Jun. 15, 2010

(54) APPARATUS AND METHOD FOR ALLOCATING SUBCHANNEL AND POWER IN COMMUNICATION SYSTEM, AND TRANSMITTING APPARATUS

(75) Inventors: Hyun-Jae Kim, Incheon (KR); Jung-Hoon Oh, Daejeon (KR); Young-Il Kim, Daejeon (KR)

(73) Assignees: Samsung Electronics Co., Ltd. (KR); Electronics and Telecommunications Research Institute (KR); KT Corporation (KR); SK Telecom Co., Ltd. (KR); Hanaro Telecom., Inc. (KR)

( * ) Notice: Subject to any disclaimer, the term of this patent is extended or adjusted under 35 U.S.C. 154(b) by 671 days.

(21) Appl. No.: 11/604,931

(22) Filed: Nov. 28, 2006

(65) Prior Publication Data

US 2007/0121666 A1    May 31, 2007

(30) Foreign Application Priority Data

Nov. 28, 2005    (KR) .................... 10-2005-0114033

(51) Int. Cl.
*H04W 4/00*    (2009.01)
*G01R 31/08*   (2006.01)
*H04J 3/16*    (2006.01)
*H04K 1/02*    (2006.01)

(52) U.S. Cl. ............... 370/329; 370/252; 370/465; 375/297

(58) Field of Classification Search ................ None
See application file for complete search history.

(56) References Cited

U.S. PATENT DOCUMENTS

| | | | |
|---|---|---|---|
| 6,137,789 A * | 10/2000 | Honkasalo | 370/342 |
| 7,012,912 B2 * | 3/2006 | Naguib et al. | 370/343 |
| 2002/0114269 A1 * | 8/2002 | Onggosanusi et al. | 370/208 |
| 2004/0127223 A1 * | 7/2004 | Li et al. | 455/446 |
| 2005/0152465 A1 * | 7/2005 | Maltsev et al. | 375/260 |
| 2005/0237989 A1 * | 10/2005 | Ahn et al. | 370/343 |

* cited by examiner

*Primary Examiner*—Nittaya Juntima
(74) *Attorney, Agent, or Firm*—The Farrell Law Firm, LLP (57) ABSTRACT

In a communication system, subchannel state information for a plurality of user equipments (UEs) are collected, and a plurality of subchannel state prediction parameter values for the respective UEs are calculated using the subchannel state information. In addition, the communication system allocates at least one subchannel among the plurality of subchannels to a first UE having the highest priority. Subsequently, the communication system determines whether to allocate additional power to the at least one subchannel based on the plurality of subchannel state prediction parameter values, and allocates additional power to a subchannel that needs the additional power among the at least one subchannel.

15 Claims, 8 Drawing Sheets

|  | Priority | Bit rate |
|---|---|---|
| UE1 | 1 | $B_1$ |
| UE2 | 3 | $B_2$ |
| UE3 | N | $B_3$ |
| UEN | 3 | $B_N$ |

FIG. 7

| UE1 | | | | TH = 0.5 | UE2 | | | |
|---|---|---|---|---|---|---|---|---|
| $S_{n,N}$ | $Z_{n,N}$ | $B_{n,N}$ | $P_{n,N}$ | | $S_{n,N}$ | $Z_{n,N}$ | $B_{n,N}$ | $P_{n,N}$ |
| $S_{1,1}$ | 0.8 | 0 | 0 | | $S_{2,1}$ | 0.4 | 3 | $P_{2,1}$ |
| $S_{1,2}$ | 0.4 | 3 | $P_{1,2}$ | | $S_{2,2}$ | 0.8 | 1 | 0 |
| $S_{1,3}$ | 0.6 | 2 | 0 | | $S_{2,3}$ | 0.9 | 2 | 0 |
| $S_{1,4}$ | 0.7 | 1 | 0 | | $S_{2,4}$ | 0.2 | 3 | $P_{2,4}$ |
| $S_{1,5}$ | 0.3 | 3 | $P_{1,5}$ | | $S_{2,5}$ | 0.2 | 3 | $P_{2,5}$ |
| $S_{1,6}$ | 0.3 | 3 | $P_{1,6}$ | | $S_{2,6}$ | 0.4 | 3 | $P_{2,6}$ |
| $S_{1,7}$ | 0.4 | 2 | $P_{1,7}$ | | $S_{2,7}$ | 0.3 | 3 | $P_{2,7}$ |
| $S_{1,8}$ | 0.4 | 2 | $P_{1,8}$ | | $S_{2,8}$ | 0.2 | 3 | $P_{2,8}$ |
| $S_{1,9}$ | 0.3 | 2 | $P_{1,9}$ | | $S_{2,9}$ | 0.6 | 2 | 0 |
| $S_{1,10}$ | 0.6 | 2 | 0 | | $S_{2,10}$ | 0.8 | 0 | 0 |
| $S_{1,11}$ | 0.6 | 2 | 0 | | $S_{2,11}$ | 0.4 | 3 | $P_{2,11}$ |
| $S_{1,12}$ | 0.4 | 2 | $P_{1,12}$ | | $S_{2,12}$ | 0.3 | 3 | $P_{2,12}$ |

FIG. 8

|     |      | UE1 | | | | | | UE2 | | |
|-----|------|------|------|------|------|------|------|------|------|------|
|     |      | $Z_{n,N}$ | $P_{n,N}$ | $B_{n,N}$ | $Z_{n,N}$ | $P_{n,N}$ | $B_{n,N}$ | $Z_{n,N}$ | $P_{n,N}$ | $B_{n,N}$ |
| $S_1$ | UE 2 | | | | | | | 0.4 | $P_{2,1}$ | 4 ↑ |
| $S_2$ | UE 1 | 0.4 | $P_{1,2}$ | 4 ↑ | | | | | | |
| $S_3$ | UE 1 | 0.6 | 0 | 3 | ① | | | | | |
| $S_4$ | UE 2 | | | | | | | 0.2 | $P_{2,4}$ | 4 ↑ |
| $S_5$ | UE 2 | | | | 0.3 | $P_{1,5}$ | 4 ↑ | | | |
| $S_6$ | UE 1 | 0.3 | $P_{1,6}$ | 4 ↑ | | | | | | |
| $S_7$ | UE 2 | | | | 0.4 | $P_{1,7}$ | 3 ↑ | | | |
| $S_8$ | UE 2 | | | | ③ | | | 0.2 | $P_{2,8}$ | 4 ↑ |
| $S_9$ | UE 1 | 0.3 | $P_{1,9}$ | 3 ↑ | | | | | | |
| $S_{10}$ | UE 1 | 0.6 | 0 | 2 | | | | | | |
| $S_{11}$ | UE 2 | | | | ② | | | 0.4 | $P_{2,11}$ | 4 ↑ |
| $S_{12}$ | UE 2 | | | | 0.4 | $P_{1,12}$ | 3 ↑ | | | |

FIG. 9

APPARATUS AND METHOD FOR ALLOCATING SUBCHANNEL AND POWER IN COMMUNICATION SYSTEM, AND TRANSMITTING APPARATUS

PRIORITY

This application claims priority to and the benefit of Korean Patent Application No. 10-2005-0114033 filed in the Korean Intellectual Property Office on Nov. 28, 2005, the contents of which are incorporated herein by reference.

BACKGROUND OF THE INVENTION

1. Field of the Invention

The present invention relates to a subchannel and power allocation method, an apparatus using the same, and a transmitting apparatus of a communication system.

2. Description of the Related Art

An Orthogonal Frequency Division Multiplexing (OFDM) method applied to a communication system divides a frequency bandwidth into a plurality of sub-frequency bandwidths (i.e., subchannels) and simultaneously transmits data through the subchannels. An Orthogonal Frequency Division Multiple Access (OFDMA) method is a multi-user version of the OFDM. In an OFDMA-based communication system, a scheduler of a base station allocates a subchannel to a user equipment (UE) according to a channel state of the user so as to satisfy service requirements of the UE. In this case, the scheduler determines a modulation coding scheme for each subchannel and allocates a subchannel so as to satisfy a transmission bit rate of the UE.

According to a subchannel allocation method for a conventional communication system, a transmitter of a base station determines a modulation/demodulation coding scheme based on a Signal to Noise Ratio (SNR) of a receiver of a terminal. A modulation/demodulation coding algorithm proposed by J. Campello sends channel information of all subcarriers as feedback and selects an appropriate modulation algorithm for each subcarrier for achieving optimum performance.

However, according to the algorithm proposed by J. Campello, an appropriate modulation/demodulation algorithm for each subcarrier is determined by allocating one transmission bit through one calculation, and this process is repeated to allocate transmission bits to the overall subcarriers. Such an algorithm that allocates bits by repeating the above process can be applied without any difficulty when the number of UEs is small, but it may be complicated when the number of UEs is large. In addition, such an algorithm uses a received SNR as feedback information, and accordingly, an accurate received SNR is required for providing appropriate performance, thereby causing an increase of the amount of feedback information.

SUMMARY OF THE INVENTION

The present invention has been made in an effort to provide a subchannel and power allocation apparatus having an advantage of efficient subchannel and power allocation, and a method thereof and a transmitting apparatus is provided including the subchannel and power allocation apparatus.

An exemplary method according to the present invention allocates a subchannel and power to a plurality of user equipments (UEs) in a communication system that divides a channel into a plurality of subchannels and includes a plurality of UEs in one frame. The method includes collecting subchannel state information for the respective UEs; calculating a plurality of subchannel state prediction parameter values for the respective UEs by using the subchannel state information; allocating at least one subchannel among the plurality of subchannels to a first UE having the highest priority among the plurality of UEs; determining whether to allocate additional power to the at least one subchannel based on the plurality of subchannel state prediction parameter values; and allocating additional power to a subchannel that needs the additional power among the at least one subchannel.

The allocation of the additional power includes comparing a subchannel state prediction parameter value of the at least one subchannel with a threshold value, and allocating additional power to a subchannel having a subchannel state prediction parameter less than the threshold value.

In addition, the method may further include allocating an additional subchannel to the first UE based on transmittable bits of the at least one subchannel.

In addition, the allocation of the additional channel comprises comparing the respective subchannel state prediction parameter values of the UEs with each other; and allocating the additional subchannel to the first UEs.

The subchannel state prediction parameter value of the additional subchannel is less than the subchannel state prediction parameter values of the rest of the plurality of UEs.

The allocation of the additional subchannel may include calculating a total number of transmittable bits of the subchannels allocated to the first UE, comparing the total number of transmittable bits with the number of transmission bits requested by the first UE, and allocating the additional subchannel to the first UE when the total number of transmittable bits is less than the number of transmission bits required by the first UE.

An exemplary apparatus according to the present invention is provided to an user equipment (UE) in a communication system that divides a channel into a plurality of subchannels and includes a plurality of UEs in a frame. The apparatus includes a state information collector, a parameter calculator, and a subchannel and power allocator. The state information collector collects a plurality of subchannel state information for the UE. The parameter calculator calculates a plurality of subchannel state prediction parameter values for the UE based on the plurality of subchannel state information. The subchannel and power allocator determines whether to allocate additional power to subchannels allocated to the UE and whether to allocate an additional subchannel to the UE based on the plurality of subchannel state prediction parameter values.

An exemplary apparatus according to another embodiment of the present invention transmits data to a plurality of user equipments (UEs) in a communication system that divides a channel into a plurality of subchannels and includes a plurality of UEs in a frame. The apparatus includes a channel estimator, a packet scheduler, a modulator, and a transmitter. The channel estimator receives subchannel state information from the respective UEs. The packet scheduler calculates a plurality of subchannel state prediction parameter values for the respective UEs by using the subchannel state information, selectively allocates additional power to subchannels allocated to a first UE among the plurality of UEs, and selectively allocates an additional subchannel to the first UE. The modulator modulates data to be transmitted to the first UE by using a subcarrier corresponding to the additional subchannel selectively allocated by the packet scheduler and forms a transmission symbol.

BRIEF DESCRIPTION OF THE DRAWINGS

The above and other objects, features and advantages of the present invention will become more apparent from the following detailed description of preferred embodiments, taken in conjunction with the accompanying drawings, in which.

DETAILED DESCRIPTION OF THE EMBODIMENTS

A preferred embodiment of the present invention will hereinafter be described in detail with reference to the accompanying drawings.

In the following detailed description, only certain preferred embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Further, throughout this specification and the claims which follow, the term "module" refers to a unit that performs a specific function or operation, and can be realized by hardware or software, or a combination of both.

A subchannel and power allocation apparatus and a method thereof, and a transmitting apparatus including the subchannel and power allocation apparatus in a communication system according to the present invention will be described in further detail. The present invention is exemplarily applied to an Orthogonal Frequency Division Multiplex Access (OFDMA)/Time Division Duplex (TDD)-based communication system, but it may also be applied to other communication systems.

Figure 1:
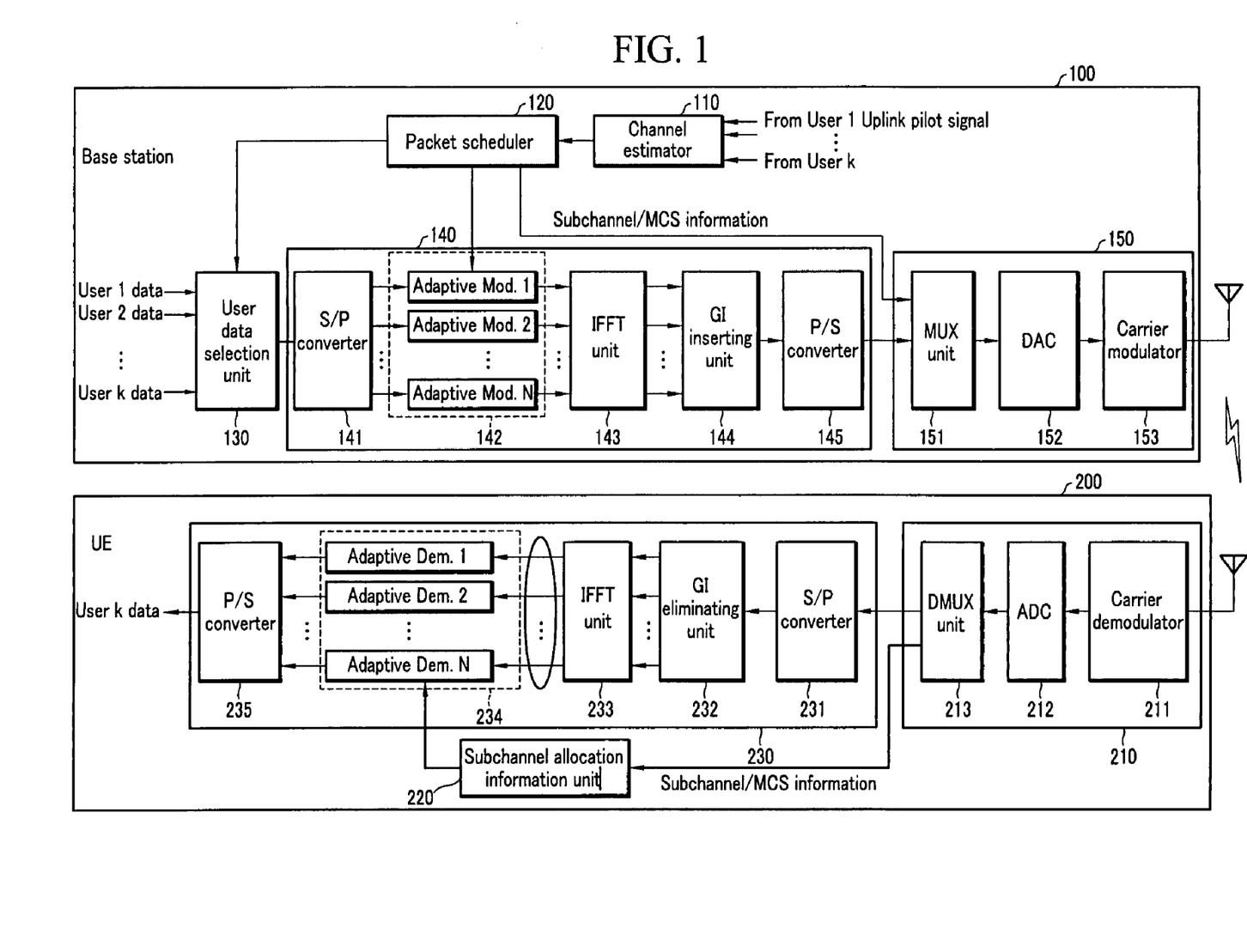
FIG. 1 is a schematic block diagram of a communication system according to the present invention.

FIG. 1 is a schematic block diagram of a communication system according to the present invention.

As shown in FIG. 1, the communication system according to the present invention includes a transmitting apparatus 100 of a base station and a receiving apparatus 200 of user equipment (UE). The transmitting apparatus 100 schedules and modulates transmission data of the UE and transmits the modulated data to the UE, and the receiving apparatus 200 detects the data transmitted thereto.

The transmitting apparatus 100 includes a channel estimator 110, a packet scheduler 120, a user data selection unit 130, an OFDM modulator 140, and a radio frequency (RF) transmitter 150.

The channel estimator 110 estimates subchannel state information of a UE from a pilot signal transmitted from the UE, and transmits the estimated subchannel state information to the packet scheduler 120.

The packet scheduler 120 allocates a UE to be served with a current frame, the amount of data transmission, a subchannel, and power by using the subchannel state information of the UE, transmitted from the channel estimator 110.

The user data selection unit 130 selects data to be transmitted the UE that will be served with the current frame from the packet scheduler 120.

The OFDM modulator 140 includes a serial to parallel (S/P) converter 141, an adaptive modulator 142, an inverse fast Fourier transform (IFFT) unit 143, a guard interval (GI) inserter 144, and a parallel to serial (P/S) converter 145. The OFDM modulator 140 modulates data to be transmitted to the UE to be served with the current frame into subcarriers that correspond to the subchannel allocated by the packet scheduler 120 and generates an OFDM symbol.

In further detail, the S/P converter 141 parallelizes the selected data corresponding to the number of subchannels, and the adaptive modulator 142 modulates the data parallelized by the S/P converter 141 by using a modulation scheme to be applied to each subchannel group. In this way, a symbol period of each subchannel can be increased corresponding to the number of subchannels while maintaining the overall transmission rate the same as before. Accordingly, a signal transmission period becomes longer than a maximum delay spread in terms of the time axis, thereby preventing interference from being generated between consecutively received signals.

The IFFT unit 143 performs IFFT on the modulated data to generate an OFDM symbol, and the guard interval inserter 144 inserts a guard interval between consecutive OFDM symbols so as to prevent inter-OFDM-symbol interference. The length of the guard interval can be greater than a maximum delay spread of a radio channel. Therefore, the OFDM symbol period corresponds to a sum of an effective symbol period during which data is substantially transmitted and the guard interval.

According to another exemplary embodiment, a cyclic prefix (CP) may be inserted where the guard interval is inserted in the case that inter-channel interference that causes distortion of other subcarriers is generated. A demodulated signal may experience phase rotation due to delay, but it does not experience inter-channel interference. Such an insertion of the cyclic prefix may reduce bandwidth efficiency. The length of the guard interval or the cyclic prefix is determined in consideration of maximum delay spread of the corresponding channel, and may be typically set to be less than ¼ of the overall symbol period. In addition, the P/S converter 145 serializes the OFDM symbol to which the guard interval is inserted.

The RF transmitter 150 includes a MUX 151, a digital to analog (D/A) converter (DAC) 152, and a carrier modulator 153, and adds a control symbol including subchannel information and bit information allocated by the packet scheduler 120 to the OFDM symbol formed by the OFDM modulator 140, and transmits the OFDM symbol to which the control symbol is added to the UE.

In further detail, the MUX 151 multiplexes the control symbol including the bit information corresponding to the power, subchannel information, and the subchannel modulation scheme, which are allocated by the packet scheduler 120, and the serialized OFDM symbol and forms one frame. The DAC 152 converts the frame into an analog signal, and the carrier modulator 153 performs frequency-up conversion on the analog signal converted from the frame signal for transmission through a specific frequency channel and transmits the analog signal through an antenna.

Subsequently, the receiving apparatus 200 includes an RF receiver 210, a subchannel allocation information unit 220, and an OFDM demodulator 230.

The RF receiver 150 includes a carrier demodulator 211, an analog to digital converter (ADC) 212, and a DEMUX 213, and separates the control symbol and the OFDM symbol from the frame signal transmitted from the transmitting apparatus 100.

In more detail, the carrier demodulator 211 performs frequency-down conversion on the frame signal received from the transmitting apparatus 100, and the ADC 212 converts the down-frequency converted frame signal into a digital signal. In addition, the DEMUX 213 demultiplexes the digitalized frame signal so as to separate the OFDM symbol and the control symbol.

The subchannel allocation information unit 220 transmits the bit information, the subchannel allocation information, and the subchannel modulation scheme included in the control symbol separated by the DEMUX 213 to an adaptive demodulator 234 of the OFDM demodulator 230.

The OFDM demodulator 230 includes an S/P converter 231, a guard interval eliminating unit 232, a FFT unit 233, an adaptive demodulator 234, and a P/S converter 235, and detects user data by demodulating the OFDM symbol that has been modulated by using the bit information and the subchannel allocation information transmitted from the subchannel allocation information unit 220.

That is, the S/P converter 231 parallelizes the OFDM symbol output from the DEMUX 213. The guard interval eliminating unit 232 eliminates the guard interval inserted between the parallelized OFDM symbols. The FFT unit 233 performs FFT on the OFDM symbol from which the guard interval is eliminated and transmits the transformed OFDM symbol to the adaptive demodulator 234. Based on the modulation scheme of the subchannel of the current frame transmitted from the subchannel allocation information unit 220, the adaptive demodulator 234 demodulates the data that has been modulated by a subcarrier of each subchannel of the OFDM symbol.

The P/S converter 235 serializes the demodulated data and extracts user data from the serialized data.

Figure 2:
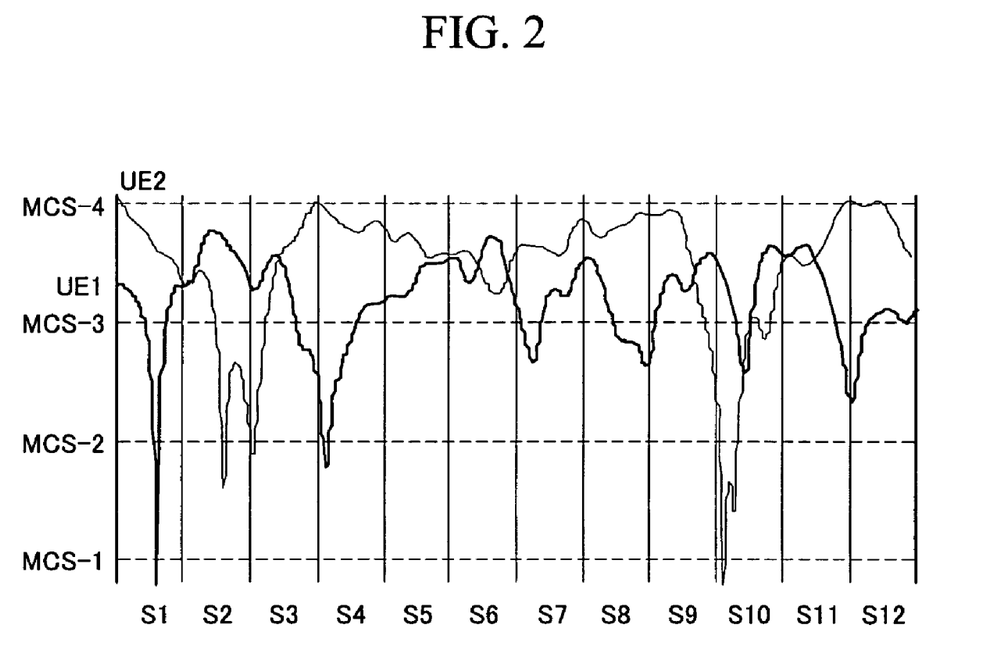
FIG. 2 shows a subchannel state of UE1 and UE2 according to the present invention.

FIG. 2 shows a subchannel state of UE1 and UE2 according to the present invention.

As shown in FIG. 2, assume that a Modulation Coding Scheme (MCS) level is divided into four levels MCS1, MCS2, MCS3, and MCS4. The MSC levels MCS1, MCS2, MCS3, and MCS4 respectively have 1-bit data rate, 2-bit data rate, 3-bit data rate, and 4-bit bit data rate. Herein, the bit data rate is determined by the MCS level, and the MCS level is set for a predetermined combination of modulation and channel coding. In the following description, Si denotes a subchannel and it is assumed that 12 subchannels S1 to S12 are provided.

Figure 3:
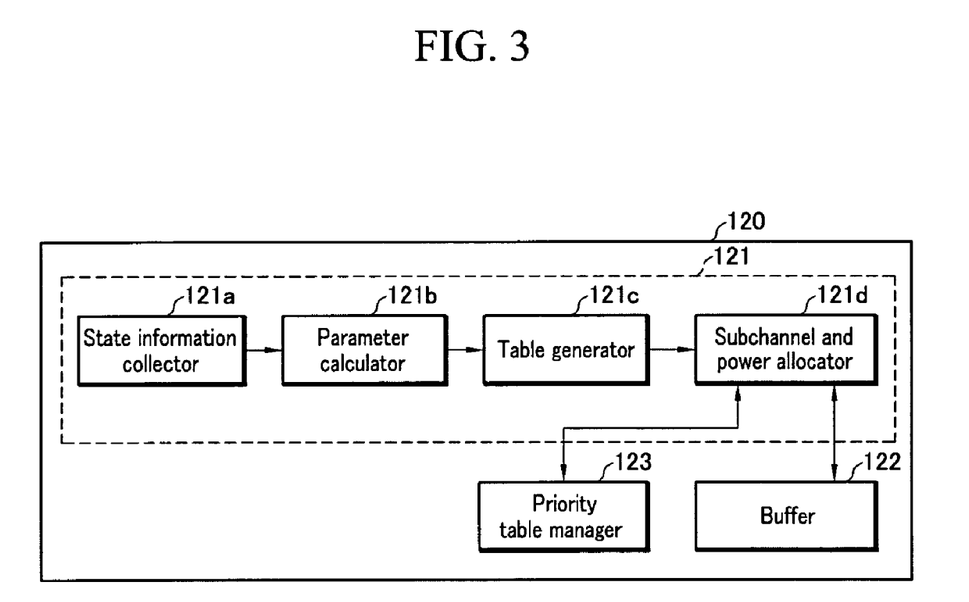
FIG. 3 is a block diagram of the packet scheduler in the transmitting apparatus of the base station according to the present invention.

FIG. 3 is a block diagram of the packet scheduler 120 in the transmitting apparatus 100 of the base station according to the present invention.

As shown in FIG. 3, the packet scheduler 120 includes a subchannel and power allocation apparatus 121, a buffer 122, and a priority table manager 123.

The subchannel and power allocation apparatus 121 includes a state information collector 121a, a parameter calculator 121b, a table generator 121c, and a subchannel and power allocator 121d.

The state information collector 121a collects a plurality of subchannel state information respectively transmitted from a plurality of UEs.

The parameter calculator 121b calculates a subchannel state prediction parameter value Z of each UE by using the collected subchannel state information of the plurality of UEs.

The table generator 121c generates a table including a subchannel state prediction parameter value Z, the number of transmittable bits B determined by the corresponding MCS level, and power values P required for increasing the MCS level for each UE.

The subchannel and power allocator 121d uses the generated table to determine whether to allocate additional power to a subchannel allocated to each UE, and determines whether to allocate an additional subchannel, accordingly.

The buffer 122 stores data to be transmitted to the plurality of UEs.

The priority table manager 123 generates a table including priority information of a plurality of UEs and frame transmission bits per frame of the plurality of UEs.

Figure 4:
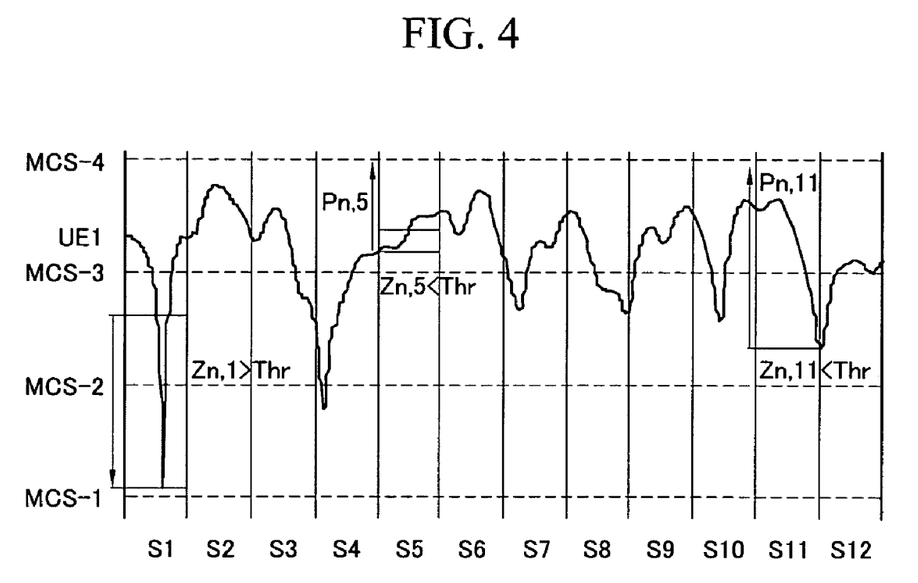
FIG. 4 shows power allocation to the UE1 of FIG. 2.

FIG. 4 shows power allocation to the UE1 of FIG. 2.

As shown in FIG. 4, the subchannel and power allocation apparatus 121 acquires a subchannel state prediction parameter value Z of the UE1. In this case, the subchannel state prediction parameter value Z can be obtained through Equation 1. The subchannel state prediction parameter value Z indicates a variation degree of a subcarrier in a subchannel. That is, a large subchannel state prediction parameter value Z indicates high channel state variation, and a small subchannel state prediction parameter value Z indicates low channel state variation.

$$Z = (\text{average value}/\text{minimum value})/(\text{Threshold} - \text{minimum value of the next MCS level}) \quad \text{Equation 1}$$

Where the average value denotes an average value of a plurality of subchannel state information of the UE1, and the minimum value denotes a minimum value among the plurality of subchannel state information of the UE1.

In addition, the subchannel and power allocation apparatus 121 determines whether to allocate additional power or an additional subchannel to the corresponding subchannel by using the subchannel state prediction parameter value Z and a threshold value, based on the channel state variation within the subchannel. Herein, the threshold value is obtained through simulations according to various channel models. That is, when the subchannel state prediction parameter value Z is greater than the threshold value, the adaptive modulation scheme will be applied to the corresponding subchannel without additional power allocation. In addition, when the subchannel state prediction parameter value Z is less than the threshold value, additional power is allocated to the corresponding subchannel and accordingly a data rate is increased.

For example, assume that subchannels S1, S5, and S11 are allocated to the UE 1. Then, the subchannel and power allocation apparatus 121 compares subchannel state prediction parameter values $Z_{n,1}$, $Z_{n,5}$, and $Z_{n,11}$ with the threshold value respectively to determine whether to allocate additional power. As shown in FIG. 4, since the subchannel state prediction parameter value $Z_{n,1}$ is greater than the threshold value Thr, the corresponding subchannel S1 may use only the adaptive modulation scheme without being allocated with additional power. In addition, the subchannel state prediction parameter values Zn,5, and Zn,11 are less than the threshold value TH, and therefore the corresponding subchannels S5 and S11 are respectively allocated with additional power and increase the level of the adaptive modulation scheme to the MCS4 such that the data rate is increased.

Figure 5:
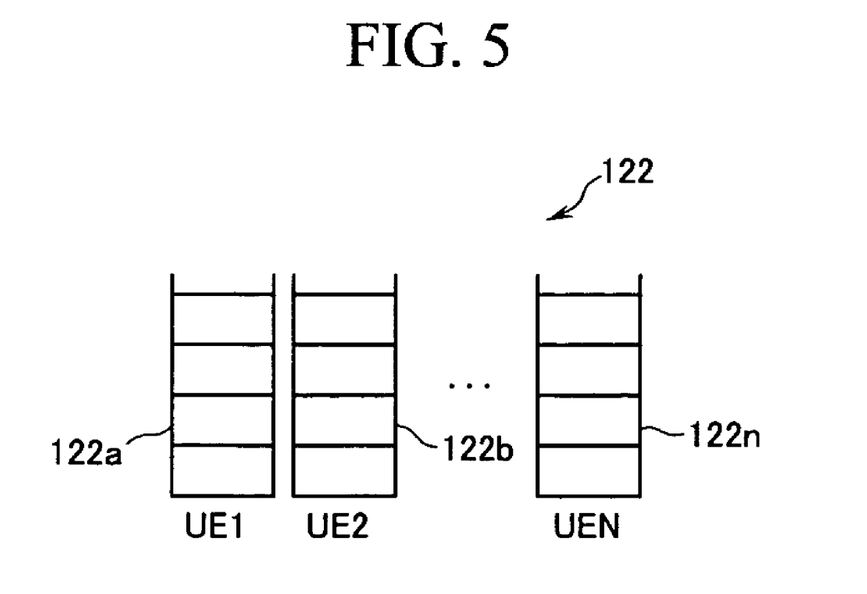
FIG. 5 schematically shows a data queue of each UE.
Figure 6:
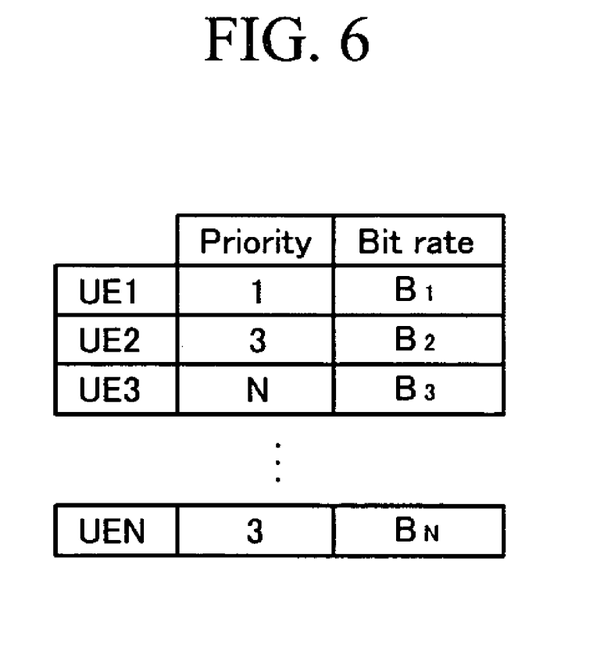
FIG. 6 schematically shows a priority table of each UE.

FIG. 5 schematically shows a data queue of each UE, and FIG. 6 schematically shows a priority table of each UE.

As shown in FIG. 5, the buffer 122 includes data queues 122a to 122n for the respective UEs. In the UE-specific data queues 122a to 122n, data to be transmitted to the respective UEs UE1 to UEN are respectively queued.

In addition, as shown in FIG. 6, the priority table manager 123 has a table for managing priorities of the respective UE1 to UEN and transmission bit rate information for each frame. That is, the packet scheduler 120 transmits the transmission data queued in the buffer to each UE through a subchannel allocated to the UE by the subchannel and power allocation apparatus 300 on a per frame basis.

Figure 7:
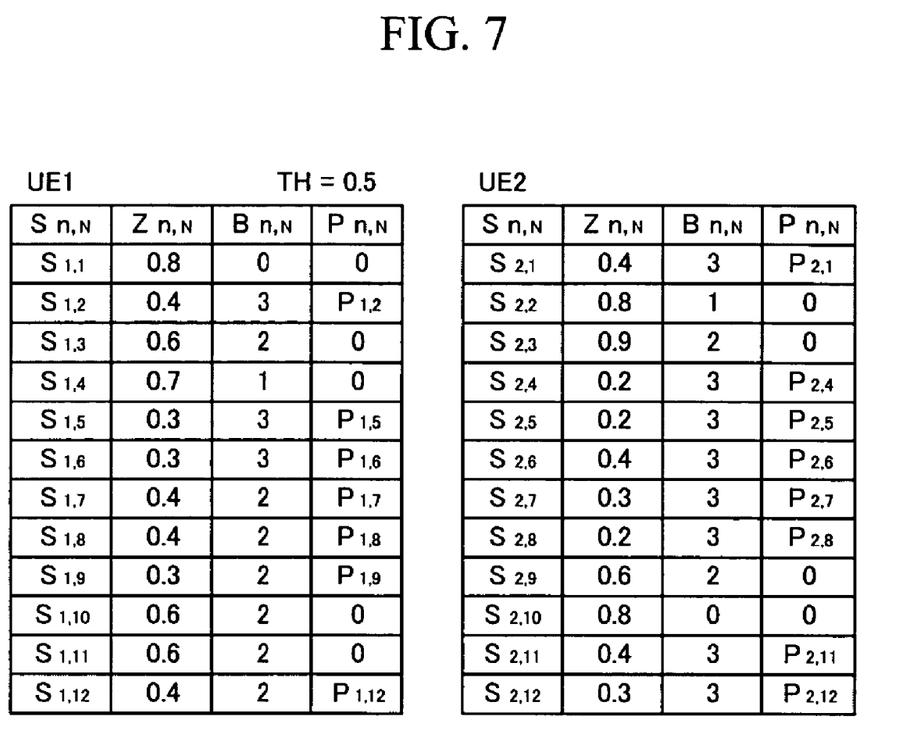
FIG. 7 shows a table generated by the table generator of FIG. 3.

FIG. 7 shows a table generated by the table generator of FIG. 3. It is assumed in FIG. 7 that two UEs UE1 and UE2 are described among the plurality of UEs, each UE UE1 and UE2 has 12 subchannels, and the threshold value (TH) is set to 0.5.

As shown in FIG. 7, the table generator 121c generates tables for the UE1 and the UE2. That is, the table generator 121c includes state prediction parameter values Z1,1 to Z1,12 for the subchannels S1,1 to S1,12, the number of transmittable bits B1,1 to B1,12 determined in accordance with the corresponding MCS level, and power values P1,1 to P1,12 in the table for the UE1. Herein, the power values P1,1 to P1,12 are used for increasing an MCS level of the corresponding subchannel by one MSC level, the subchannel having a subchannel state prediction parameter value that is less than the threshold value TH. In a manner similar to the above, the table generator 121c generates a table for the UE2.

Figure 8:
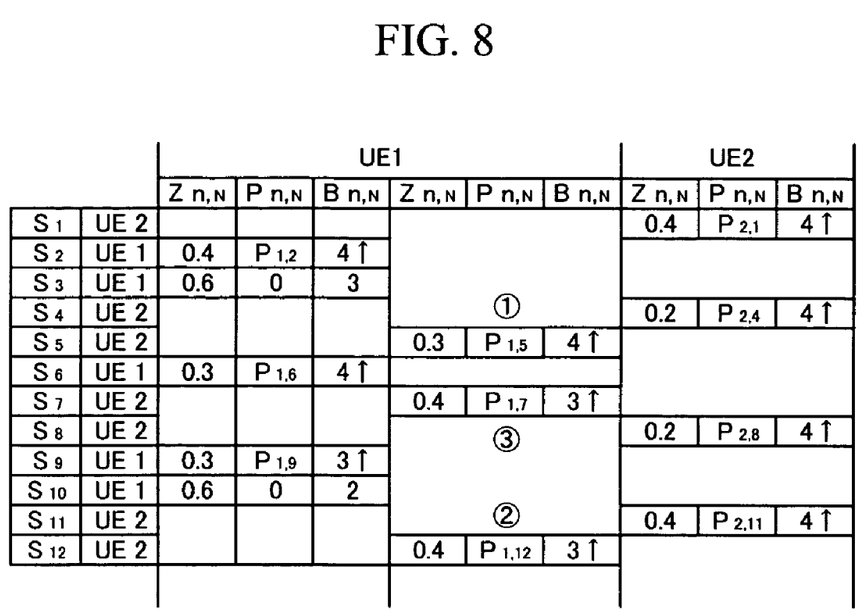
FIG. 8 shows a subchannel and power allocation method of the subchannel and power allocator of FIG. 3.

FIG. 8 shows a subchannel and power allocation method of the subchannel and power allocator of FIG. 3.

As shown in FIG. 8, the subchannel and power allocator 121d of FIG. 3 compares a channel state of the respective subchannels of the UE1 and the UE2 by using the tables of FIG. 7 and selects one having a good channel state. In the tables of FIG. 7, the UE1 has better channel states for the subchannels $S_{n,2}$, and $S_{n,3}$, $S_{n,6}$, $S_{n,9}$, and $S_{n,10}$ than those of the UE2, and the UE2 has better channel states for subchannels $S_{n,1}$, and $S_{n,4}$, $S_{n,5}$, $S_{n,7}$, $S_{n,8}$, and $S_{n,11}$, and $S_{n,12}$ than those of the UE1.

In this case, assume that target transmission bits of the UE1 are 24 bits and target transmission bits of the UE2 are 20 bits. Therefore, the UE1 has a higher priority over the UE2, and accordingly, the UE1 has higher allocation priority.

Figure 9:
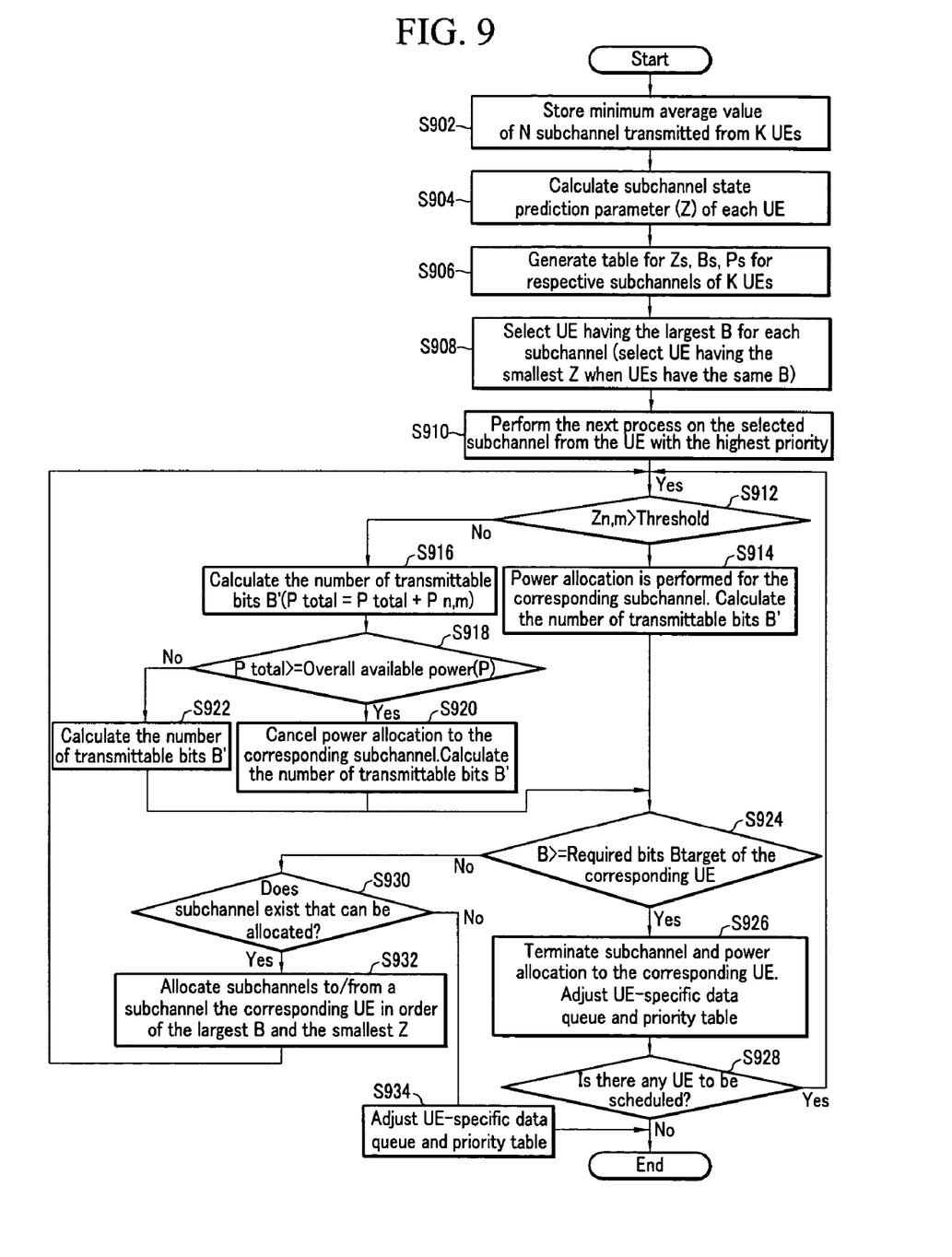
FIG. 9 is a flowchart of an operation process of the subchannel and power allocation apparatus in the communication system according to the present invention.

In the case of the UE1, additional power is allocated to a subchannel having a subchannel state prediction parameter value Z1,1 to Z1,12 less than the threshold value among the subchannels $S_{1,2}$, $S_{1,3}$, $S_{1,6}$, $S_{1,9}$, and $S_{1,10}$ through steps S912 to S922 of FIG. 9. The steps S912 to S922 will be described later with reference to FIG. 9

It is illustrated in FIG. 8 that the additional power is allocated to the subchannels $S_{1,2}$, $S_{1,6}$, and $S_{1,9}$ and thus the amount of data transmission is increased by 1 bit. However, although the amount of data transmission of the subchannels $S_{1,2}$, $S_{1,6}$, and $S_{1,9}$ has been increased, the overall data transmittable bits (i.e., 16 bits) of the subchannels $S_{1,2}$, $S_{1,3}$, $S_{1,6}$, $S_{1,9}$, and $S_{1,10}$ selected for the UE1 are less than the target transmission bits (i.e., 24 bits), and therefore, the subchannel and power allocation process is performed again on the UE1.

The subchannels $S_{2,1}$, $S_{2,4}$, $S_{2,5}$, $S_{2,7}$, $S_{2,8}$, $S_{2,11}$, and $S_{2,12}$ of the UE2 having a priority lower than the UE1 and the corresponding subchannels of UE1, i.e., $S_{1,1}$, $S_{1,4}$, $S_{1,5}$, $S_{1,7}$, $S_{1,8}$, $S_{1,11}$, and $S_{1,12}$ are compared, and a subchannel having a higher number of transmittable bits and a subchannel state prediction parameter value lower than the threshold value is selected from among the corresponding subchannels of UE1 as an additional subchannel (①). Then, additional power is allocated to the additional subchannel (i.e., subchannel $S_{1,5}$) and the number of transmittable bits of the subchannel $S_{1,5}$ is increased by 1 bit. However, the total transmittable bits (i.e. 20 bits) of the subchannels $S_{1,2}$, $S_{1,3}$, $S_{1,6}$, $S_{1,9}$, and $S_{1,10}$ and the additional subchannel $S_{1,5}$ of the UE1 are less than the target transmission bits (i.e. 24 bits) of the UE 1, and therefore, a subchannel having a higher number of transmittable bits and a subchannel state prediction parameter value Z that is lower than the threshold value is selected from among the subchannels $S_{1,1}$, $S_{1,4}$, $S_{1,7}$, $S_{1,8}$, $S_{1,11}$, $S_{1,12}$ of the UE1 as an additional subchannel (②). Then, additional power is allocated to the additional subchannel (i.e. $S_{1,12}$) and the number of transmittable bits of the subchannel $S_{1,12}$ is increased by 1 bit.

However, the total transmittable bits (i.e., 23 bits) of the subchannels $S_{1,2}$, $S_{1,3}$, $S_{1,6}$, $S_{1,9}$, and $S_{1,10}$ and the additional subchannels $S_{1,15}$ and $S_{1,12}$ of the UE1 are still less than the target transmission bits (i.e., 24 bits), and thus a subchannel having a higher number of transmittable bits and a subchannel state prediction parameter value Z that is less than the threshold value is selected from among the subchannels $S_{1,1}$, $S_{1,4}$, $S_{1,7}$, $S_{1,8}$, and $S_{1,11}$ allocated to the UE1 as an additional subchannel (③). Additional power is allocated to the selected additional subchannel (i.e., $S_{1,7}$) and the number of transmittable bits of the subchannel $S_{1,7}$ is increased by 1 bit. Then, the total transmittable bits (i.e., 26 bits) of the subchannels $S_{1,2}$, $S_{1,3}$, $S_{1,6}$, $S_{1,9}$, and $S_{1,10}$ and the additional subchannels $S_{1,5}$, $S_{1,7}$, and $S_{1,12}$ of the UE1 satisfy the target transmission bits (24 bits) of the UE1.

As a result, total transmittable bits (16 bits) of the subchannels selected for the UE2 are less than the target transmission bits of the UE2 (i.e., 20 bits), and accordingly, the subchannel and power allocation process that has been performed on the current frame is terminated.

FIG. 9 is a flowchart of an operation process of the subchannel and power allocation apparatus in the communication system according to the present invention.

As shown in FIG. 9, the subchannel and power allocation apparatus 121 stores average value information and minimum value information on N subchannels transmitted from K UEs in step S902, and calculates subchannel state prediction parameter values Zs for the K UEs in step S904. Then, the subchannel and power allocation apparatus 121 generates a table including N subchannel state prediction parameter values Zs, N transmission bits Bs, and N power allocation values Ps for the K UEs, in step S906. The subchannel and power allocation apparatus 121 searches for a UE having the largest transmission bits B for each subchannel by using the table. In this case, when there are more than two UEs having the largest transmission bits, the subchannel and power allocation apparatus 121 searches for a UE having a small subchannel state prediction parameter value among the more than two UEs, in step S908.

Subsequently, the subchannel and power allocation apparatus 121 performs a process for determining whether to allocate an additional subchannel or additional power to the searched UE with the highest priority. That is, the subchannel and power allocation apparatus 121 determines whether to allocate an additional subchannel or additional power to a selected subchannel m from a UE having the highest priority among the plurality of UEs UE1 to UEN, in step S910.

The subchannel and power allocation apparatus 121 compares a state prediction parameter value (Zn,m) of the selected subchannel m with the threshold value by using the previously generated table, in step S912. When the state prediction parameter value (Zn,m) of the selected subchannel m is greater than the threshold value, the subchannel and power allocation apparatus 121 calculates the number of transmittable bits B' without allocating additional power to the selected subchannel m, in step S914. When the state prediction parameter value (Zn,m) of the selected subchannel m is less than the threshold value, the subchannel and power allocation apparatus 121 allocates the additional power to the selected subchannel m and calculates total power ($P_{total}=P_{total}+P_{n,m}$). Herein, $P_{n,m}$ denotes the amount of additional power allocated to the subchannel m. In addition, the subchannel and power allocation apparatus 121 compares the total power $P_{total}$ calculated in step S916 with the overall available power P, in step S918.

When the total power $P_{total}$ is greater than the overall available power P, there is no power to be further allocated. Therefore, the subchannel and power allocation apparatus 121 cancels the power allocation to the subchannel m and calculates the number of transmittable bits B', in step S920. However, when the total power $P_{total}$ is less than the overall available power P, the subchannel and power allocation apparatus 121 allows the additional power allocation to the subchannel m and calculates the number of transmittable bits B' for the subchannel m, in step S922.

The subchannel and power allocation apparatus 121 compares the number of transmittable bits B' calculated in steps S914, S920, and S922 with the number of target bits $B_{target}$ of the corresponding UE, respectively, in step S924. When the calculated number of transmittable bits B' is greater than or equal to the number of the target bits $B_{target}$ of the corresponding UE, the subchannel and power allocation apparatus 121 terminates the subchannel and power allocation process since the target transmission bit of the corresponding UE has been satisfied. Then, the subchannel and power allocation apparatus 121 takes the amount of data corresponding to the number of transmission bits and properly modifies the priority table of the scheduled UE, in step S926.

Subsequently, the subchannel and power allocation apparatus 121 checks whether there is a UE to be scheduled in step S928, and when there is a UE to be scheduled, the subchannel and power allocation apparatus 121 returns to step S910 and repeats the subsequent steps.

Meanwhile, when the number of transmittable bits B calculated in step S924 is less than the number of the target bits $B_{target}$ of the corresponding UE, the subchannel and power allocation apparatus 121 checks whether there exist subchannels to be additionally allocated in step S930, and allocates the subchannels to UEs UE1 to UEN in order from the highest transmission bits B and the lowest subchannel state prediction parameter value Z in step S932, which is performed so as to reduce the maximum number of subchannels to be allocated and allocate power within an allowable range.

Then, the subchannel and power allocation apparatus 121 returns to the step S912 and repeats the subsequent steps. When it is determined in step S930 that there is no subchannel to be additionally allocated, the subchannel and power allocation apparatus 121 properly modifies the UE-specific data queue and UE-specific priority table and terminates the scheduling process in the current frame, in step S934.

As described above, a channel state of each UE is compared with each other by using the subchannel state prediction parameter values calculated from channel state information of UEs and determines whether to allocate additional subchannels to a current UE or whether to allocate a predetermined amount of power to the current UE rather than increasing the number of subchannels. Therefore, subchannel and power allocation to each UE can be efficiently managed so as to satisfy a UE having a highest priority.

The above-described exemplary embodiments of the present invention may be realized by an apparatus and a method, but may also be realized by a program that realizes functions corresponding to configurations of the exemplary embodiments or a recording medium that records the program.

Such a realization can be easily performed by a person skilled in the art.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A method for allocating a subchannel and power to a plurality of user equipments (UEs) in a communication system that divides a channel into a plurality of subchannels and includes a plurality of UEs, the method comprising:
   collecting, by a state information collector, subchannel state information for the respective UEs;
   calculating, by a parameter calculator, a plurality of subchannel state prediction parameter values for the respective UEs using the subchannel state information;
   allocating, by a subchannel and power allocator, at least one subchannel among the plurality of subchannels to a first UE having a highest priority among the plurality of UEs;
   determining, by the subchannel and power allocator, whether to allocate additional power to the at least one subchannel based on the plurality of subchannel state prediction parameter values; and
   allocating, by the subchannel and power allocator, additional power to a subchannel that needs the additional power among the at least one subchannel,
   wherein allocating the additional power comprises:
   comparing a subchannel state prediction parameter value of the at least one subchannel with a threshold value; and
   allocating additional power to a subchannel having a subchannel state prediction parameter value less than the threshold value.

2. The method of claim 1, further comprising allocating an additional subchannel to the first UE based on transmittable bits of the at least one subchannel.

3. The method of claim 2, wherein the allocation of the additional channel comprises:
   comparing the respective subchannel state prediction parameter values of the UEs with each other; and
   allocating the additional subchannel to the first UE,
   wherein the subchannel state prediction parameter value of the additional subchannel is less than the subchannel state prediction parameter values of the rest of the plurality of UEs.

4. The method of claim 2, wherein the allocation of the additional subchannel comprises:
   calculating a total number of transmittable bits of the subchannels allocated to the first UE;
   comparing the total number of transmittable bits with the number of transmission bits requested by the first UE; and allocating the additional subchannel to the first UE when the total number of transmittable bits is less than the number of transmission bits requested by the first UE.

5. The method of claim 4, further comprising terminating allocation of additional power and an additional subchannel to the first UE when the total number of transmittable bits is greater than the number of transmission bits requested by the first UE.

6. The method of claim 4, wherein the additional subchannel has the largest number of transmittable bits among the plurality of subchannels except for the subchannel allocated to the first UE.

7. The method of claim 4, wherein, when there are at least two subchannels respectively having the least number of transmittable bits among the plurality of subchannels except for the subchannel allocated to the first UE,
the additional subchannel is one of the at least two subchannels, having the least subchannel state prediction parameter value.

8. The method of claim 2, further comprising performing the allocation of additional power and additional subchannel to a second UE having a second highest priority among the plurality of UEs.

9. The method of claim 8, wherein the priority is determined by a number of transmittable bits by a UE in a corresponding frame.

10. A transmitting apparatus of a base station in a communication system that divides a channel into a plurality of subchannels and includes a plurality of user equipments (UEs), the apparatus comprising:
a state information collector for collecting subchannel state information for a UE;
a parameter calculator for calculating a plurality of subchannel state prediction parameter values for the UE based on the subchannel state information;
a subchannel and power allocator for determining whether to allocate additional power to subchannels allocated to the UE and determining whether to allocate an additional subchannel to the UE based on the plurality of subchannel state prediction parameter values; and
a transmitter for transmitting information about the allocated subchannels to the UE,
wherein the subchannel and power allocator allocates the additional power to a subchannel having a subchannel state prediction parameter value that is less than a threshold value among the subchannels allocated to the UE.

11. The apparatus of claim 10, further comprising a table generator for generating a table that includes the plurality of subchannel state prediction parameter values, a number of transmittable bits determined by a corresponding Modulation Coding Scheme (MCS) level, and a power value required for increasing the MCS level.

12. The apparatus of claim 10, wherein the subchannel and power allocator determines whether to allocate the additional power based on a total number of transmittable bits of the subchannels allocated to the UE.

13. An apparatus for transmitting data to a plurality of user equipments (UEs) in a communication system that divides a channel into a plurality of subchannels and includes a plurality of UEs, the transmitting apparatus comprising:
a channel estimator for receiving subchannel state information from respective UEs;
a packet scheduler for calculating a plurality of subchannel state prediction parameter values for the respective UEs by using the subchannel state information, selectively allocating additional power to subchannels allocated to a first UE among the plurality of UEs, and selectively allocating an additional subchannel to the first UE;
a modulator for modulating data to be transmitted to the first UE by using a subcarrier corresponding to the additional subchannel selectively allocated by the packet scheduler and generating a transmission symbol; and
a transmitter for transmitting the transmission symbol to the first UE, and adding to the transmission symbol a control symbol that includes information on a subchannel and a number of bits allocated to the first UE.

14. The apparatus of claim 13, wherein the packet scheduler comprises:
a buffer including a plurality of data queues that respectively contain data to be transmitted to the respective UEs;
a table manager for managing information on priorities of the respective UEs and information on a number of transmission bits per frame of the respective UEs; and
a subchannel and power allocator for allocating additional power to a subchannel having a subchannel state prediction parameter value that is less than a threshold value among the subchannels allocated to the first UE, and allocating an additional subchannel when a total number of transmittable bits of the subchannels allocated to the first UE is less than a required number of transmission bits.

15. The apparatus of claim 14, wherein the subchannel and power allocator determines the subchannel having a largest number of transmittable bits as the additional subchannel among the subchannels, excluding the subchannels allocated to the first UE.

* * * * *